Oct. 28, 1947.　　　F. H. HAGNER　　　2,429,754
NAVIGATIONAL GLOBE
Filed Aug. 3, 1943　　　3 Sheets-Sheet 1
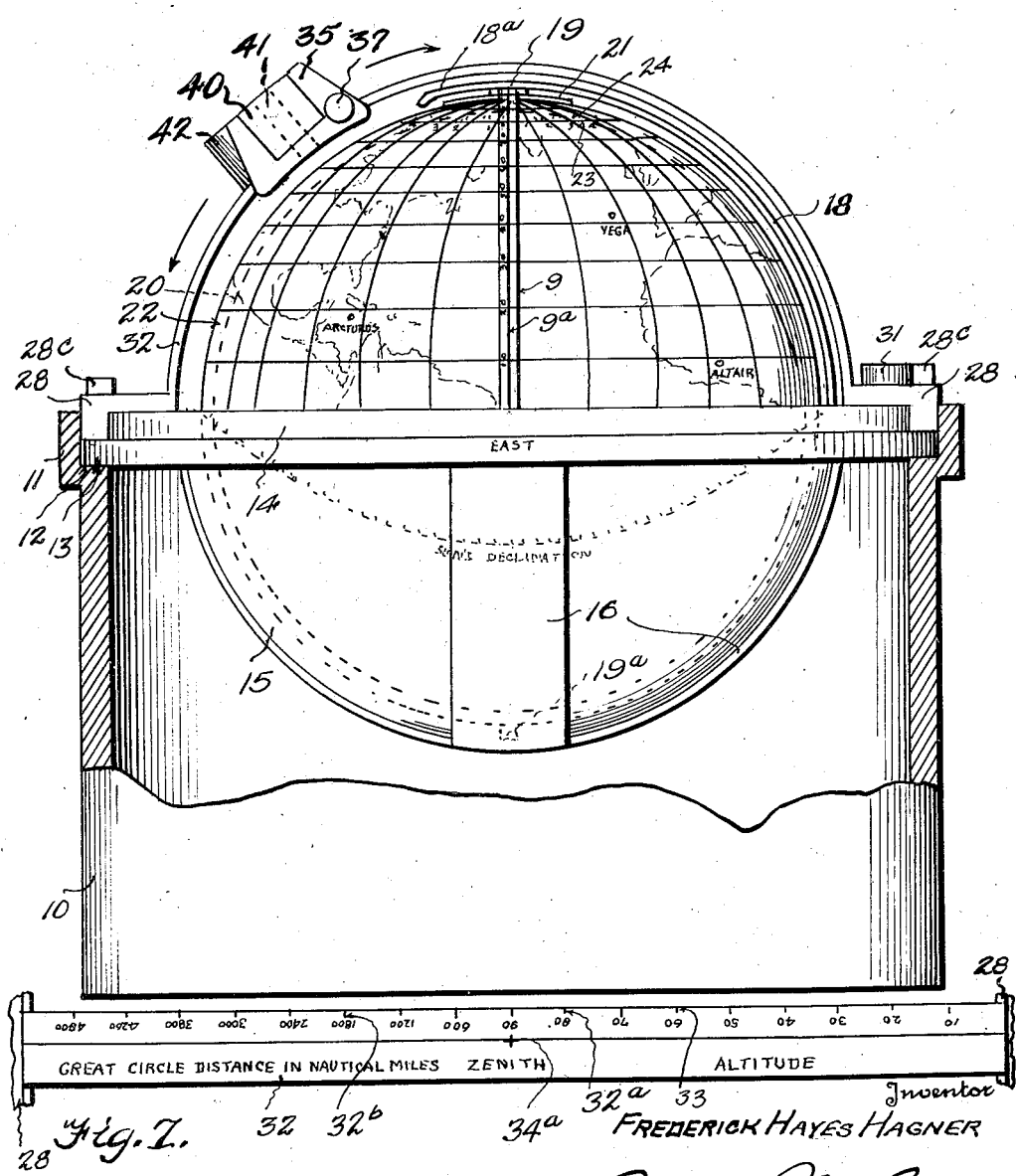

Oct. 28, 1947.  F. H. HAGNER  2,429,754
NAVIGATIONAL GLOBE
Filed Aug. 3, 1943  3 Sheets-Sheet 2
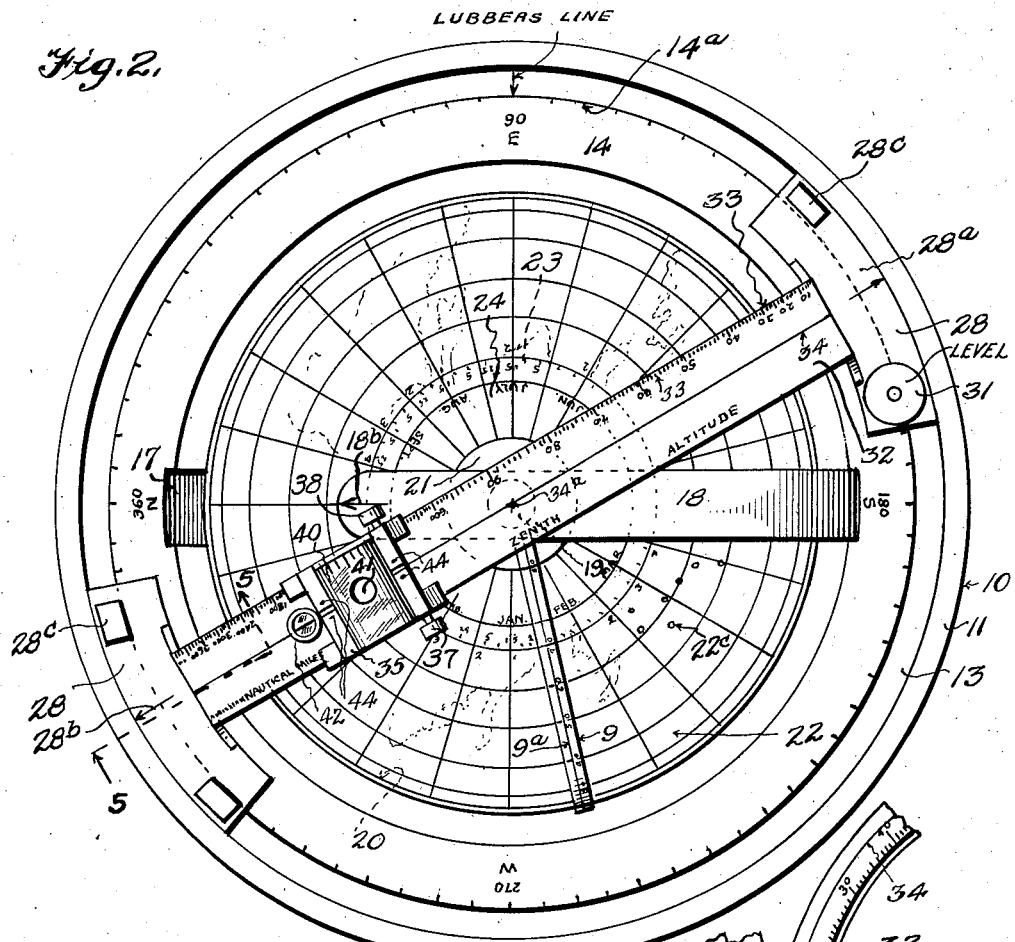
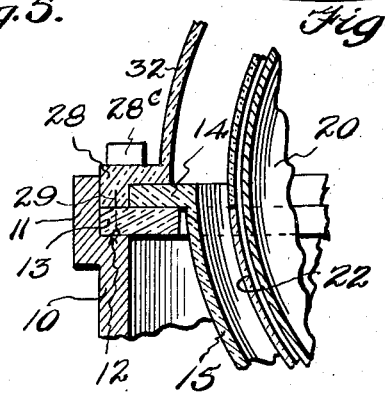
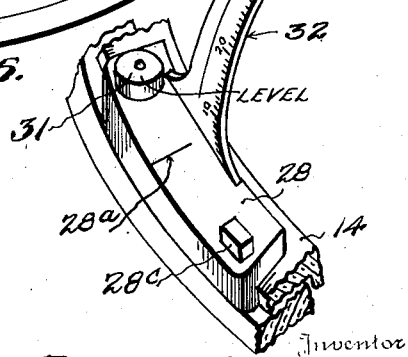
Inventor
FREDERICK HAYES HAGNER
By Irving A. McCathran
Attorney

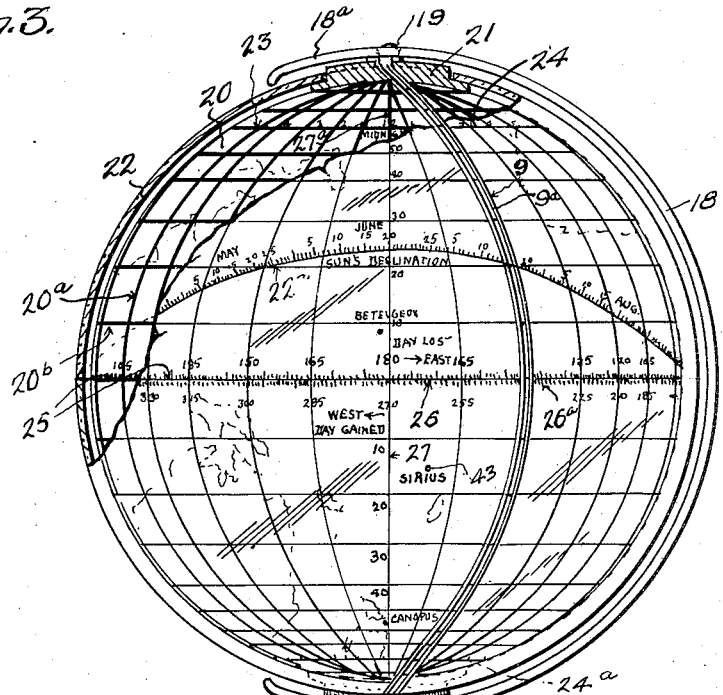
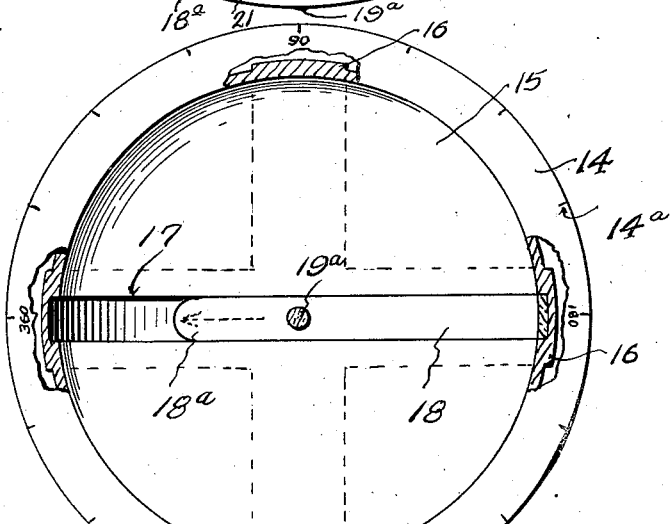
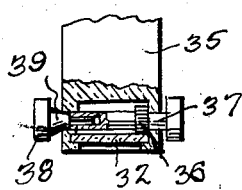

Patented Oct. 28, 1947

2,429,754

UNITED STATES PATENT OFFICE 2,429,754

NAVIGATIONAL GLOBE

Frederick Hayes Hagner, San Antonio, Tex.

Application August 3, 1943, Serial No. 497,213

5 Claims. (Cl. 33—61)

This invention relates to a navigational globe and has for one of its objects the production of a simple and efficient instrument for reproducing the path of movement of all celestial bodies used in navigation, precisely as these bodies are observed from any point on the earth's surface.

A further object of this invention is the production of an instrument embodying an inner world globe which is rotatably mounted within an outer transparent celestial globe, the celestial globe having designations to indicate the position of any navigational star at any selected time for any selected geographical location, and to indicate the celestial dome which is visible at a selected location.

A still further object of this invention is the production of a simple and efficient instrument for accurately designating the horizon with respect to the eye of the observer.

By means of the present instrument, the descriptive text of any navigation treatise may be illustrated. That is to say, the descriptive matter of the text may be visually displayed upon the instrument by illustrating the selected or actual position of a celestial body with respect to the position of the observer or student.

The present instrument has been devised to provide a miniature of the celestial sphere containing the names and locations of twenty-two navigational stars, certain of the stars being shown in the accompanying drawings upon the various figures.

A world globe is rotatably mounted within the celestial globe and the world globe is provided with designations indicating all coordinates. The present device is provided with means for reproducing the path of movement of all celestial bodies known in navigation exactly as these bodies are seen or observed from any selected point on the earth's surface. With the proper settings and provided the instrument is level, the rays of light such for instance as from the sun, may be cast upon the world globe from the time of sun-rise to sun-set. While in this position, the altitude and azimuth of the sun may be measured. The true relationship of all coordinates may be studied so that a student may always carry in his mind a clear picture of the various positions of the celestial bodies during the entire period of twenty-four hours of the day. The foundation of nautical astronomy and celestial navigation necessitate the navigator having a clear understanding of the entire universe and its motions relative to selected positions upon the earth. The results of a clear understanding and the working out of navigational problems by means of the present instrument will make an indelible print upon the mind of the navigator so that when he is face to face with the actual problems, the positions of the various celestial bodies will be clearly understood.

In view of the fact that the astronomical triangle has five elements of calculation, the present instrument permits any problem to be solved mechanically when any three elements of the triangle are known. For example, the five elements are, latitude (elevation of the pole), local hour angle, declination, altitude and azimuth. Furthermore, the present instrument permits its installation in a plane or ship for the purpose of checking the ship or plane's compass, day or night, so long as the latitude is known and celestial bodies are visible. This instrument affords a means for the pilot to identify all stars visible in the heavens at any time or any place on the earth, and to precompute the altitude and azimuth of all navigational stars visible.

In the drawings—

Figure 1 is a side elevational view of the instrument with a portion of the support shown in section;

Figure 2 is a top plan view of the instrument;

Figure 3 is a side elevational view of the world globe shown mounted within the transparent celestial globe, a portion of the celestial globe being broken away and also showing the supporting band for these globes;

Figure 4 is a top plan view partly in section illustrating the globe-supporting bowl;

Figure 5 is an enlarged vertical section taken on line 5—5 of Figure 2;

Figure 6 is a fragmentary perspective view illustrating one of the supports for the altitude and great circle arc;

Figure 7 is a plan view of the altitude and great circle arc illustrating the scale formed thereon;

Figure 8 is a section taken radially of the great circle and altitude arc through the adjoining parts of the index slide, which is carried by said arc of Figure 1.

By referring to the drawings it will be seen that 10 designates the base or support which may be of any suitable design, but which is preferably of circular construction having an annular rim 11 at its upper end which surrounds a supporting shoulder or ledge 12. A track ring 13 rests upon this supporting shoulder or ledge 12 and is adapted to be freely rotated thereon. An azimuth circle 14 fits flat upon the track ring 13 and this azimuth circle 14 carries a semi-spherical globe-supporting bowl 15 which globe-supporting bowl 15 fits into the support or base 10. This bowl 15 is provided with exterior reinforcing ribs 16 arranged in cross-like relation upon the outer face and a channel 17 is formed in the inner face of the bowl 15, the channel 17 extending from side to side and across the center of the bowl, as shown.

An arc-shaped transparent supporting band 18 is adapted to slide within the channel 17 for the purpose of permitting the poles of the globe to be elevated or lowered. This band 18 supports the poles or journals 19 and 19$^a$ of the world globe 20, the world globe 20 being rotatable upon these poles or journals 19 and 19$^a$. The world globe 20 carries at each pole, a bearing 21, these bearings 21 being fixed to the poles of the world globe 20. The globe 22 is rotatably mounted upon the bearings 21, a portion of the outer globe 22 being shown in section adjacent the upper bearing 21, to illustrate one of the bearings. Because of this structure the bearings 21 which are fixed to the poles of the world globe 20 may be contacted by the fingers of an operator to rotate the world globe within the celestial globe 22 while the globe 22 is held stationary, or the celestial globe 22 may be rotated upon the bearings 21 while the operator holds the world globe 20 stationary by firmly holding the bearings 21 in a set position by means of pressure from his fingers.

A transparent band 9 is journaled upon the bearings 19 and 19$^a$ and this band 9 is provided with a heavy longitudinal line 9$^a$ throughout its longitudinal center. The band 9 is adapted to be brought over any of the selected scales of hour angle, sun declination, stars, or any other indication upon the world globe or celestial globe for the purpose of clearly visualizing one side of the astronomical triangle. The line 9$^a$ is preferably made heavier than the markings upon the world globe so that this may be readily seen.

As is shown in Figure 3, the terrestrial globe journal 19 constitutes the North Pole and the journal 19$^a$ constitutes the South Pole thereof. This globe 20 is provided with the usual lines of longitude 20$^a$ and the usual equator line 25, as well as the lines of latitude 20$^b$. A time circle or scale 23 (24 hours) is located around each pole 19 and 19$^a$.

An outer transparent celestial globe 22 encases the world globe 20, and is slightly spaced therefrom to permit relative rotation of the globes, and the celestial globe 22 is preferably formed of two semi-spherical sections, cemented or joined together at the line of the equator. The bearings 21 at the respective poles of the world globe extend through the transparent celestial globe, as shown in Figure 3, to provide a bearing and support for the celestial globe at the respective poles, and to permit the transparent celestial globe to freely rotate relative to the world globe 20. The bearings or poles 19 and 19$^a$ also permit the celestial globe 22, as well as the world globe 20, to rotate upon these poles or bearings 19 and 19$^a$, since these bearings are carried near the respective ends of the band 18. The band 18 is provided with a protruding end 18$^a$ at each of its opposite extremities, and an indicating arrow, such as the arrow 18$^b$ shown in Figure 2, is preferably etched upon the extensions 18$^a$ to facilitate the reading of the position of the globes with respect to these projecting extensions 18$^a$.

A time scale 23, marked in hours for a twenty-four hour period, is carried by each hemisphere of the world globe in a position to be traversed by one of the arrows 18$^b$, and a calendar marking 24 is carried by the transparent celestial globe, the time scale carried by the world globe 20 being spaced axially with respect to the calendar marking 24 carried by the transparent celestial globe 22.

The equator line 25 on the world globe 20 is marked and designated for east and west longitude. The sidereal hour angle circle is indicated, as at 26, on the outer transparent celestial globe 22 and is suitably graduated, as at 26$^a$. At right angles to the sidereal hour angle circle is arranged a declination circle 27 on the celestial globe 22 which is suitably graduated. A longitude line 27$^a$ is suitably graduated in degrees latitude.

The celestial globe 22 is marked with the sun's declination, as at 22$^a$, designating the annual path of the sun, and a calendar (365 days)—see Figure 3. The band 18 which supports and carries both the world globe 20 and the celestial globe 22 is placed so as to fit within the channel 17 of the bowl 15, and this band may slide in this channel 17 to elevate or lower the poles of these globes to any selected setting, according to the latitude of the observer.

The bowl 15, as stated above, supports an azimuth circle 14 which is suitably graduated upon its upper faces indicated at 14$^a$. The base or case 10 carries upon the shoulder or ledge 12 an arrow to indicate the lubber's line or ship's heading, which is adapted to register with these graduations 14$^a$ of the azimuth circle 14 to indicate the heading of the ship.

The track ring 13 carries a pair of oppositely disposed supporting plates 28 arranged 180° apart, and these plates are fixed to the track ring 13 by means of pins 29, cement, or other suitable securing means. The plates 28 are provided with lugs 28$^c$ to facilitate the rotating of the plates and track ring 13 upon the supporting ledge 12. These supporting plates 28 overhang the azimuth circle 14, as shown in detail in Figures 5 and 6, and a ball-level device 31 is carried by one of these plates 28, as shown in Figure 6. The ball-level device may be provided with luminous paint at its bottom directly below the ball to show the movement of the ball in the dark. A great circle and altitude arc 32 is supported at its opposite ends upon the plates 28, and this great circle and altitude arc 32 is arched over the globes 20 and 22 and is spaced sufficiently from the band 18 to permit the band and globes to freely rotate thereunder to a selected position. This great circle and altitude arc 32 is suitably graduated from end to end upon one side as at 33, to indicate degrees from zenith to one end, and nautical miles from zenith to the opposite end. A longitudinally extending line 34 is formed upon the outer face of the arc 32 for the purpose of indicating the center of this arc and a mark 34$^a$ is placed thereon to designate zenith, as shown in Figures 2 and 7.

An index slide 35 is slidably mounted upon the arc 32 and a friction roller 36 is carried by the slide 35 for contacting the outer face of the arc 32 and facilitating the longitudinal movement of the index slide to a selected position upon the arc 32. This friction roller 36 is carried by a suitable shaft 37 having a slidable keyed section 38. This slidable keyed section 38 is provided with a tapering shank 39 for fitting in a suitable tapering socket in the slide 35 to frictionally lock the shaft 37 in a set position. Preferably all of the parts are made of transparent plastic material. The slide 35 is provided with a magnifying glass 40 at its center, and this glass 40 is provided with a central aperture through which a ray of light may be cast from a selected celestial body, such as the sun, and the like, on a location upon the world globe, which would be the sub-solar point.

A second magnifying glass 42 is carried by the slide 35 to facilitate the reading of the various scales on the celestial globe 22 and terrestrial globe 20.

It should be understood that the present device constitutes a means for showing the sub-solar and sub-stellar points on the earth. In the celestial globe 22, I preferably place the navigation stars in their accurate positions thereon, by boring a hole in the plastic globe 22 and coating the periphery of the hole with luminous material—note particularly the star indicated as Sirius, by the numeral 43. The Big Dipper, as at 22c, see Figure 2, and other designations such as the Southern Cross, may appear upon the celestial globe 22.

The hour markings from midnight, and six hours in each direction (6 p. m to 6 a. m.) on the world globe are preferably of luminous material so that they may be viewed during the dark hours. The slide 35 is provided upon the top thereof with spaced luminous filled apertures 44 upon either side of its center, to provide a sighting device at night, so that the observer may sight the selected star and obtain its altitude by getting the star in the line of division between the four luminous points 44, two at each respective end of the slide.

Should the latitude not be known, this instrument has a means of determining the exact latitude at noon by measuring the highest point at which the sun appears in the heavens. The world globe 20 and the celestial globe 22 are rotated to bring the arrow 18b in a position to point to the day of the month and time of the day on the dials 23 and 24, at which the observation is being taken. The observer will face the sun at noon, level the device, and will move the slide 35 to a point where the rays of sun pass through the aperture 41 and are cast upon the world globe through the transparent celestial globe 22. Then he moves the band 9 so that the line 9a overlies the date of observation on the declination scale 22a. Then he rotates the celestial globe and also adjusts the elevation of the pole, until the date of observation on the declination scale 22a coincides with the ray of light cast on the globes. The rays of light passing through the transparent celestial globe will indicate upon the terrestrial or world globe the latitude of the observer and its value may be read on scale 33 at the position of the slide 35.

The supporting plates 28 are provided with finger-engaging knobs 28c to facilitate the rotation of the plates 28 about the azimuth scale ring 14.

For the purpose of explanation, the following examples are given:

1. In determining the true north, when the latitude and longitude are known, the instrument is first leveled by observing the level 31. The band 18 is moved within the length of the channel 17 to raise or lower the poles of the globes 20 and 22 to place the observer's latitude directly under zenith. The operator then faces the sun (as an example) holding the instrument level while moving the arc 32 and slide 35 to a position to cause the sun to cast a ray of light through the aperture 41 upon the world globe 20 and through the transparent globe 22. The altitude of the sun may then be read on the scale 33 as seen through the magnifying glass 40 at the marking opposite the aperture 41. The band 9 is then swung to a position where the line 9a overlies the date of observation on the sun's declination scale 22a. The arc 32 is then rotated until the aperture 41 is directly over line 9a on the band 9. The entire instrument is then rotated until the aperture 41 is in line with a ray of light cast by the sun through the aperture 41. Then the elevated pole will be pointed true north. The instrument must of course, be held level.

2. In determining the local sun's time, leave the settings as per the above example. Then rotate the inner world globe 20 until 12 noon on scale 23 is directly under arrow 18b on the band 18. Then read the time under line 9a on band 9 at the point where it crosses the time scale 23. This gives the local sun time.

3. In determining the great circle distance and initial course, place point of departure on the world globe under zenith 34a and move arc 32 and the indicator 35 until aperture 41 is over the point of destination. Then read the position of the indicator 35 relative to the great circle scale 32b in miles on arc 32—see Figure 7 for details of scale. The arrow 28b indicates on the azimuth scale 14 the initial course.

4. To set the instrument to show the position of principal navigation stars for a given location on the earth and for a given date and time, set the observer's geographical position on the globe 20 under zenith 34a. Then rotate the globe 20 until midnight on scale 23 is directly under arrow 18b of band 18. Then rotate the celestial globe 22 to bring the selected date on scale 24 over the selected time of night on scale 23. This automatically places all of the stars on the globe 22 exactly in the relative positions in which they will be seen for the date and time set from the selected position. This offers a quick means for making sky diagrams. By revolving the celestial globe in step with the hands of the operator's watch, the moving of the celestial bodies from east to west will be reproduced.

By means of this instrument an observer may determine his position at a selected time within the time zone where the observation is taken.

The inner or world globe 20 is sealed and constitutes a float or buoyant support for the instrument in the event that the instrument should drop into the water. All other parts of the instrument are preferably made of transparent material and all vital parts are anchored or secured together in their respective relations.

This instrument constitutes a position finder in the nature of a sun and stellar compass, and therefore provides means for steering a ship, raft, or person or group of persons, in a desired direction to a point of destination. The scale and slide upon the great circle and altitude arc provide a chart or means for designating the distance and direction in which progress is being made.

Having described the invention, what I claim is:

1. An instrument for visibly indicating in miniature the relative positions of selected celestial bodies with respect to a selected position of an observer at a selected time of observation, comprising a pair of closely-arranged concentric globes mounted to turn independently on a common axis passing through the North and South Poles of the globes, the inner globe bearing a world map, and the outer globe being transparent and constituting a celestial globe having relative positions of celestial bodies indicated thereon, a concentric time scale carried by the inner globe near a pole thereof, a date scale carried by the transparent outer globe adjacent the time scale of the inner globe, an indicator band carrying the globes and pivoted at the common axis of the globes, said band having means for registering with selected locations on the time and date scales to indicate the hour and date of calculation, a fixed azimuth scale surrounding the globes, a base supporting the azimuth scale and indicating band, the band being adjustable vertically of the azimuth scale to selectively elevate and lower the poles of the globes, an altitude and great circle arc carrying a scale and adjustable circumferentially of the azimuth scale, an indicator adjustable upon the altitude and great circle arc adapted to define a path radial of the globe for a ray of light cast from a selected celestial body upon a selected location on said inner globe and a selected location upon the outer globe for measuring the altitude of said selected celestial body upon the scale of said altitude and great circle arc, and azimuth index means carried by said last mentioned arc for indicating the position of said last mentioned arc relative to said azimuth scale.

2. An instrument for visibly indicating in miniature the relative positions of selected celestial bodies with respect to a selected position of an observer at a selected time of observation, comprising a pair of closely-arranged concentric globes mounted to turn independently on a common axis passing through the North and South Poles of the globes, the inner globe bearing a world map, and the outer globe being transparent and constituting a celestial globe having relative positions of celestial bodies indicated thereon, a concentric time scale carried by the inner globe near a pole thereof, a date scale carried by the transparent outer globe adjacent the time scale of the inner globe, an indicator band carrying the globes and pivoted at the common axis of the globes, said band having means for registering with selected locations on the time and date scales to indicate the hour and date of calculation, a fixed azimuth scale surrounding the globes, a base supporting the azimuth scale and indicating band, the band being adjustable vertically of the azimuth scale to selectively elevate and lower the poles of the globes, an altitude and great circle arc carrying a scale and adjustable circumferentially of the azimuth scale, an indicator adjustable upon the altitude and great circle arc adapted to define a path radial of the globes for a ray of light cast from a selected celestial body upon a selected location on said inner globe and a selected location upon the outer globe for measuring the altitude of said selected celestial body upon the scale of said altitude and great circle arc, azimuth index means carried by said last mentioned arc for indicating the position of said last mentioned arc relative to said azimuth scale, the altitude and great circle arc being graduated in degrees, the position of the indicator upon said arc indicating in degrees the altitude of the celestial body upon said celestial globe over which the indicator is positioned, the altitude and great circle arc also having a scale in miles for indicating the distance between a selected point of departure on the world globe placed directly under zenith and the point of destination which appears under said indicator on said arc, the distance between zenith and the indicator giving the distance in miles between the point of departure and the point of destination, and the azimuth index means indicating on the azimuth scale the original course to travel from the point of departure to the point of destination.

3. An instrument for visibly indicating in miniature the relative positions of selected celestial bodies with respect to a selected position of an observer at a selected time of observation comprising an inner and an outer globe concentrically mounted to turn independently on a common axis passing through the poles of the globes, the inner globe bearing a world map, and the outer globe being a transparent celestial globe, a concentric time scale carried by the inner globe, a date scale carried by the outer globe adjacent the time scale, a date-indicating means movable around said time and date scales, means supporting said poles to facilitate elevating and lowering the poles of said globes, an azimuth scale surrounding said globes, an arc adjustable circumferentially of said azimuth scale and said globes, the arc spanning the globes, means carried by the arc and azimuth scale for indicating the position of said arc relative to said azimuth scale, an indicator adjustable relative to the length of said arc, said arc having a scale to measure the position of the indicator upon said arc, a sun's declination scale carried by the transparent outer globe, a second transparent band bisecting said sun's declination scale and pivoted at said poles to move about said globes to a selected position relative to the sun's declination scale, a graduated scale at the equator of said inner globe, and a graduated scale at the equator of the transparent globe overlying the last mentioned scale.

4. An instrument for visibly indicating in miniature the relative positions of selected celestial bodes with respect to a selected position of an observer at a selected time of observation comprising a cup-like base, a transparent celestial globe, a terrestrial globe mounted within the celestial globe, means for pivotally connecting the globes at their poles, a rigid supporting band supported upon said base and pivotally connected to the globes at their poles, the axis of the terrestrial globe projecting through the celestial globe near the poles to render the globes independently rotatable relative to each other and to facilitate the rotation of the terrestrial globe within the celestial globe, said base having an inner face provided with an open guiding channel therein extending diametrically of the center of the base, and said band being retained in and slidably mounted longitudinally within the channel to adjust the elevation of the poles of the globes, the band also being so mounted as to be lifted out of the channel when it is desired to remove the globe from the base.

5. An instrument for visibly indicating in miniature the relative positions of selected celestial bodies with respect to a selected position of an observer at a selected time of observation comprising a cup-like base, a transparent celestial globe, a terrestrial globe mounted within the celestial globe, means for pivotally connecting the globes at their poles, a rigid supporting band supported upon said base and pivotally connected to the globes at their poles, the axis of the terrestrial globe projecting through the celestial globe near the poles to render the globes independently rotatable relative to each other and to facilitate the rotation of the terrestrial globe within the celestial globe, said base having an inner face provided with an open guiding channel therein extending diametrically of the center of the base, said band being retained in and slidably mounted longitudinally within the channel to adjust the elevation of the poles of the globes, the band also being so mounted as to be lifted out of the channel when it is desired to remove the globe from the base, an altitude measuring scale mounted to move in azimuth about said globes, and a sighting device slidably mounted upon said altitude measuring scale movable to a selected point of intersection between selected designations upon said globes and a selected celestial body, the position of the sighting device upon the altitude scale indicating the altitude of the selected celestial body and the position of the base of the altitude scale in azimuth indicating the azimuth of the celestial body at the time of observation.

FREDERICK HAYES HAGNER.

REFERENCES CITED

The following references are of record in the file of this patent:

UNITED STATES PATENTS

| Number | Name | Date |
|---|---|---|
| 2,055,148 | Hagner | Sept. 22, 1936 |
| 2,187,947 | Marks | Jan. 23, 1940 |
| 1,836,423 | Wright | Dec. 15, 1931 |
| 387,957 | Moreon | Aug. 14, 1888 |
| 2,087,970 | Hannah | July 27, 1937 |
| 336,280 | Bailey | Feb. 16, 1886 |
| 501,136 | Gregory | July 11, 1893 |
| 1,928,025 | McEwan | Sept. 26, 1933 |
| 2,051,810 | Ashlock | Aug. 25, 1936 |
| 538,889 | Arvidson | May 7, 1895 |
| 686,127 | Potter | Nov. 5, 1901 |
| 1,346,412 | Meitner | July 13, 1920 |
| 1,949,403 | Ashlock | Mar. 6, 1934 |
| 248,259 | Gross | Oct. 11, 1881 |
| 2,102,413 | Hall | Dec. 14, 1937 |
| 2,355,304 | Koch | Aug. 8, 1944 |
| 357,994 | Hite | Feb. 15, 1887 |